United States Patent
Cunha et al.

(10) Patent No.: US 7,131,818 B2
(45) Date of Patent: Nov. 7, 2006

(54) AIRFOIL WITH THREE-PASS SERPENTINE COOLING CHANNEL AND MICROCIRCUIT

(75) Inventors: Frank J. Cunha, Avon, CT (US); Bret Teller, Meriden, CT (US); Young Chon, Manchester, CT (US); Dominic Mongillo, West Hartford, CT (US); Edward F. Pietraszkiewicz, Southington, CT (US)

(73) Assignee: United Technologies Corporation, Hartford, CT (US)

( * ) Notice: Subject to any disclaimer, the term of this patent is extended or adjusted under 35 U.S.C. 154(b) by 166 days.

(21) Appl. No.: 10/979,597

(22) Filed: Nov. 2, 2004

(65) Prior Publication Data

US 2006/0093480 A1    May 4, 2006

(51) Int. Cl.
*F01D 5/16*    (2006.01)
(52) U.S. Cl. .................... 416/97 R; 415/115
(58) Field of Classification Search ........... 415/115, 415/116; 416/90 R, 95, 96 R, 97 R
See application file for complete search history.

(56) References Cited

U.S. PATENT DOCUMENTS

| 5,720,431 A | * | 2/1998 | Sellers et al. ............ 416/97 R |
| 6,514,042 B1 | * | 2/2003 | Kvasnak et al. .......... 416/97 R |
| 6,896,487 B1 | * | 5/2005 | Cunha et al. ............. 416/97 R |

OTHER PUBLICATIONS

U.S. Appl. No. 10/637,352 entitled: "Microcircuit Airfoil Main Body," filed Aug. 8, 2003.

\* cited by examiner

*Primary Examiner*—Edward K. Look
*Assistant Examiner*—Dwayne J White
(74) *Attorney, Agent, or Firm*—Carlson, Gaskey & Olds (57) ABSTRACT

An airfoil, and in a disclosed embodiment a rotor blade, has a serpentine cooling path. To best account for the Coriolis effect, the paths of the serpentine cooling channel have trapezoidal cross-sections. An area of the rotor blade between a smaller side of the trapezoidal-shaped paths, and a facing wall of the rotor blade has high thermal and mechanical stresses, and is a challenge to adequately cool. A microcircuit, which is a very thin cooling circuit having crossing pedestals, is embedded into the blade in this area. The microcircuit provides additional cooling, and addresses the challenges with regard to cooling these areas.

32 Claims, 6 Drawing Sheets

AIRFOIL WITH THREE-PASS SERPENTINE COOLING CHANNEL AND MICROCIRCUIT

BACKGROUND OF THE INVENTION

This invention relates to a cooling scheme for use in an airfoil, such as a turbine blade, or vane, wherein a serpentine cooling channel is supplemented by an additional cooling microcircuit at an area of high stress.

Turbine blades are utilized in gas turbine engines. As known, a turbine blade typically includes a platform, with an airfoil shape extending above the platform. The airfoil is curved, extending from a leading edge to a trailing edge, and between a pressure wall and a suction wall.

Cooling circuits are formed within the airfoil body to circulate cooling fluid, typically air. One type of cooling circuit is a serpentine channel. In a serpentine channel, air flows serially through a plurality of paths, and in opposed directions. Thus, air may initially flow in a first path from a platform of a turbine blade outwardly through the airfoil and reach a position adjacent an end of the airfoil. The flow is then returned in a second path, back in an opposed direction toward the platform. Typically, the flow is again reversed back away from the platform in a third path.

The location and shape of the paths in a serpentine channel has been the subject of much design consideration.

During operation of the gas turbine engine, the cooling air flowing inside the paths is subjected to a rotational force. The interaction of the flow through the paths and this rotation results in what is known as a Coriolis force which creates internal flow circulation in the paths. Basically, the Coriolis force is proportional to the vector cross product of the velocity vector of the coolant flowing through the passage and the angular velocity vector of the rotating blade. Thus, the Coriolis effect is opposite in adjacent ones of the serpentine channel paths, dependent on whether the air flows away from, or towards, the platform.

To best utilize the currents created by the Coriolis effect, designers of airfoils have determined that the flow channels, and in particular the paths that are part of the serpentine flow path, should have a trapezoidal shape. Essentially, the Coriolis effect results in there being a primary flow direction within each of the flow channels, and then a return flow on each side of this primary flow. Since the cooling air is flowing in a particular direction, designers in the airfoil art have recognized the heat transfer of a side that will be impacted by this primary direction will be greater than on the opposed side. Thus, the trapezoidal shapes have been designed to ensure that a larger side of the cooling channel will be impacted by the primary flow direction. As mentioned, this primary flow direction will be different in the first and third paths described above, than it is in the second path. With such trapezoidal-shaped paths for a serpentine flow, the wall adjacent the smaller side of the trapezoid has less cooling surface area and less cooling efficiency.

In addition, in some cases, the smaller side of the trapezoidal path may be spaced from a wall by a relatively great distance. Further, the serial flow paths are typically at an area of high curvature that is subject to relatively high mechanical and thermal stresses.

For all of these reasons, the area between a smaller side of one of the trapezoidal flow paths and its facing wall is an area that could benefit from additional cooling.

Recently, the assignee of the present invention has developed cooling circuits that are embedded into the wall of an airfoil, which have been called microcircuits. These microcircuits are disclosed in a co-pending U.S. patent application Ser. No. 10/637,352, entitled "Microcircuit Airfoil Main Body," and which was filed on Aug. 8, 2003. These microcircuits have never been disclosed for use at the above area between the smaller side of the trapezoidal flow path in a serpentine channel and the facing wall.

SUMMARY OF THE INVENTION

In a disclosed embodiment of this invention, an airfoil has a microcircuit cooling circuit embedded in an area between the smaller side of one of the paths of a serpentine channel and the adjacent wall. This microcircuit is provided with cooling air from one of the other paths in the serpentine channel. Further, in the disclosed embodiments, the microcircuit exhausts air through a series of small openings to provide film cooling to the surface of the airfoil at the adjacent wall.

The location of the microcircuit is aligned with an area of high curvature on the wall of the airfoil blade. For this additional reason, and for reasons mentioned above, this area is subject to high thermal and mechanical stress. Thus, the microcircuit is at a location that benefits greatly from the additional cooling.

The microcircuit is embedded into the wall, in a location adjacent to the path, and between the path and the pressure wall. The microcircuit is preferably very small in a dimension measured between the smaller side and the facing pressure wall. Moreover, the microcircuit is actually preferably a plurality of spaced microcircuits spaced along a direction extending from the platform and outwardly.

In one application, the area of high stress is between a second path smaller side, and the pressure wall. In this embodiment, the microcircuits are preferably fed with cooling air from the third path.

The present invention also extends to providing microcircuits between the smaller sides of the paths and the suction wall, as appropriate. Thus, in a second embodiment, the microcircuit is positioned between a first path smaller side and the suction wall. In this embodiment, the microcircuit is provided with cooling air from the second flow path.

These and other features of the present invention can be best understood from the following specification and drawings, the following of which is a brief description.

DETAILED DESCRIPTION OF THE PREFERRED EMBODIMENT

Figure 1:
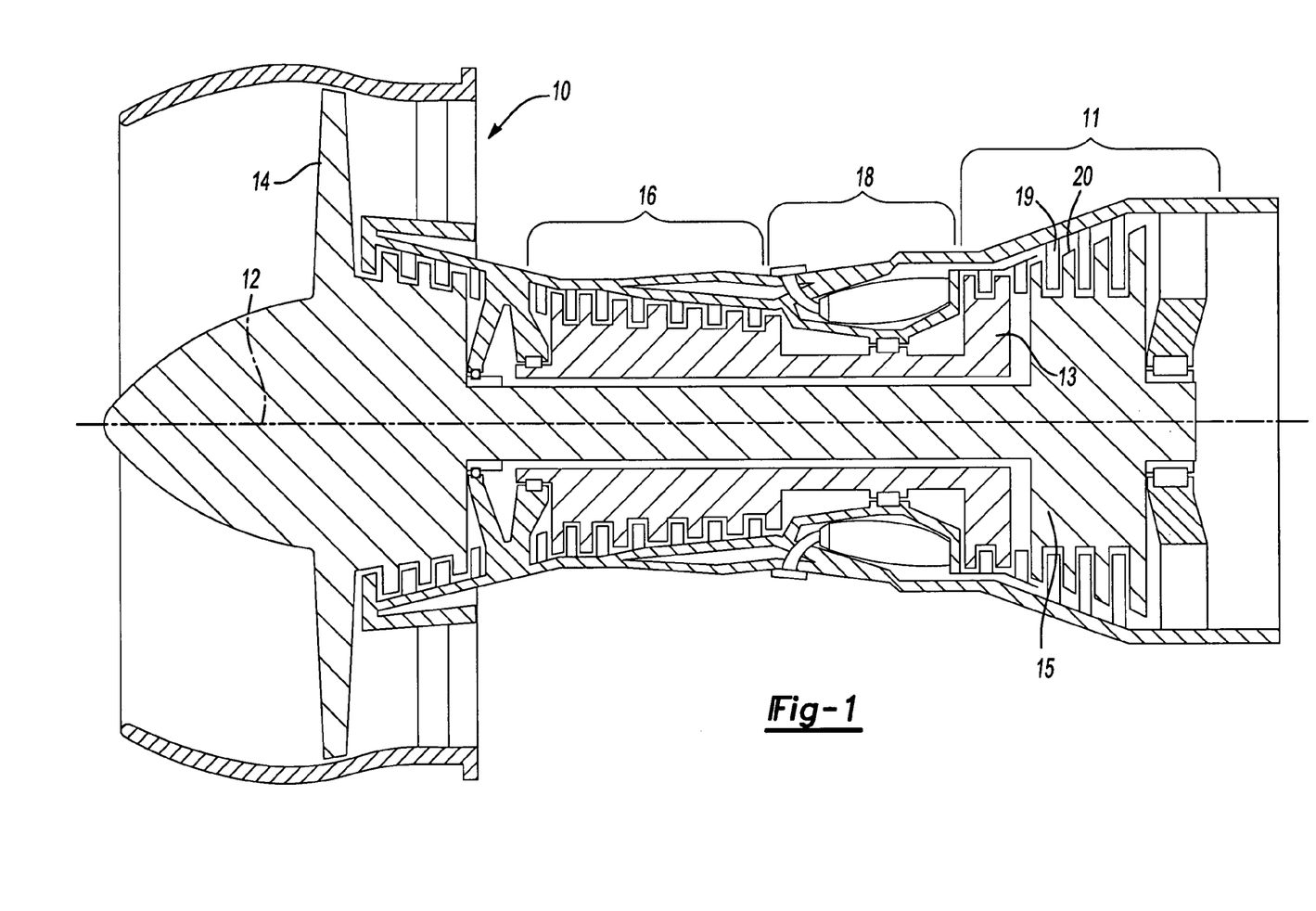
FIG. 1 is a schematic of a gas turbine engine incorporating the present invention.

FIG. 1 shows a gas turbine engine 10, such as a gas turbine used for power generation or propulsion, circumferentially disposed about an engine centerline, or axial centerline axis 12. The engine 10 includes a fan 14, a compressor 16, a combustion section 18 and a turbine 11. As is well known in the art, air compressed in the compressor 16 is mixed with fuel that is burned in the combustion section 18 and expanded in turbine 11. The air compressed in the compressor and the fuel mixture expanded in the turbine 11 can both be referred to as a hot gas stream flow. The turbine 11 includes rotors 13 and 15 that, in response to the expansion, rotate, driving the compressor 16 and fan 14. The turbine 11 comprises alternating rows of rotary blades 20 and static airfoils or vanes 19. FIG. 1 is a somewhat schematic representation, for illustrative purposes only, and is not a limitation on the instant invention that may be employed on gas turbines used for electrical power generation, aircraft, etc.

Figures 2, 3:
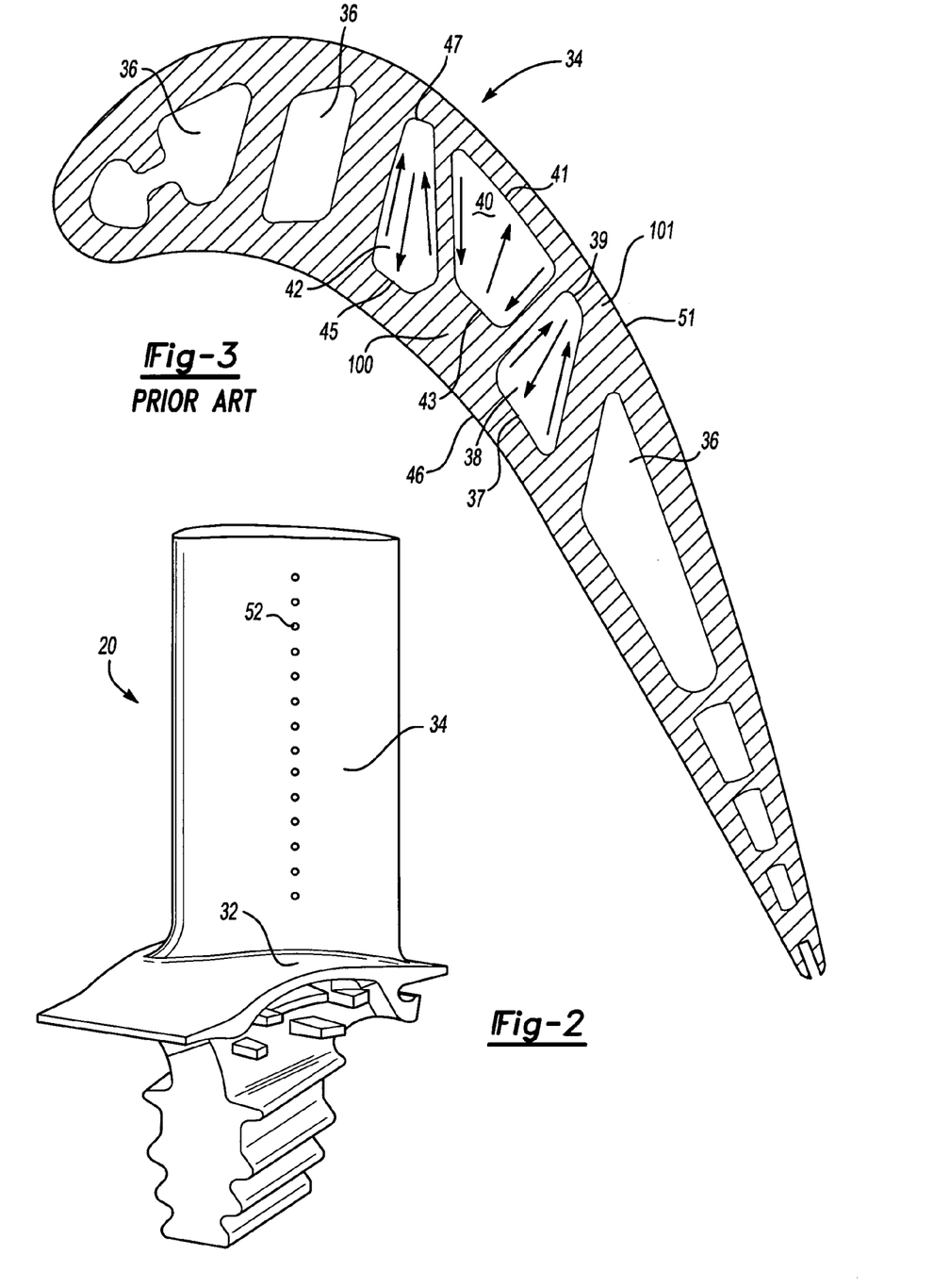
FIG. 2 is a view of a first embodiment invention.
FIG. 3 is a cross-sectional view through a Prior Art turbine blade.

A rotary blade 20 is illustrated in FIG. 2 having a platform 32, with an airfoil 34 extending upwardly away the platform 32. While the present invention is being illustrated in a turbine blade, it should be understood that the invention would also have value in static structure such as a vane 19.

Cooling channels are provided through prior art airfoil 34 such as is shown in FIG. 3. Cooling channels 36 receive airflow from a supply adjacent the platform 32, and direct that airflow outwardly along the length of the airfoil 34. A serpentine channel is identified by paths 38, 40, 42 to circulate air in an outward and inward direction as the air flows serially through paths 38, 40 and 42.

Figure 4:
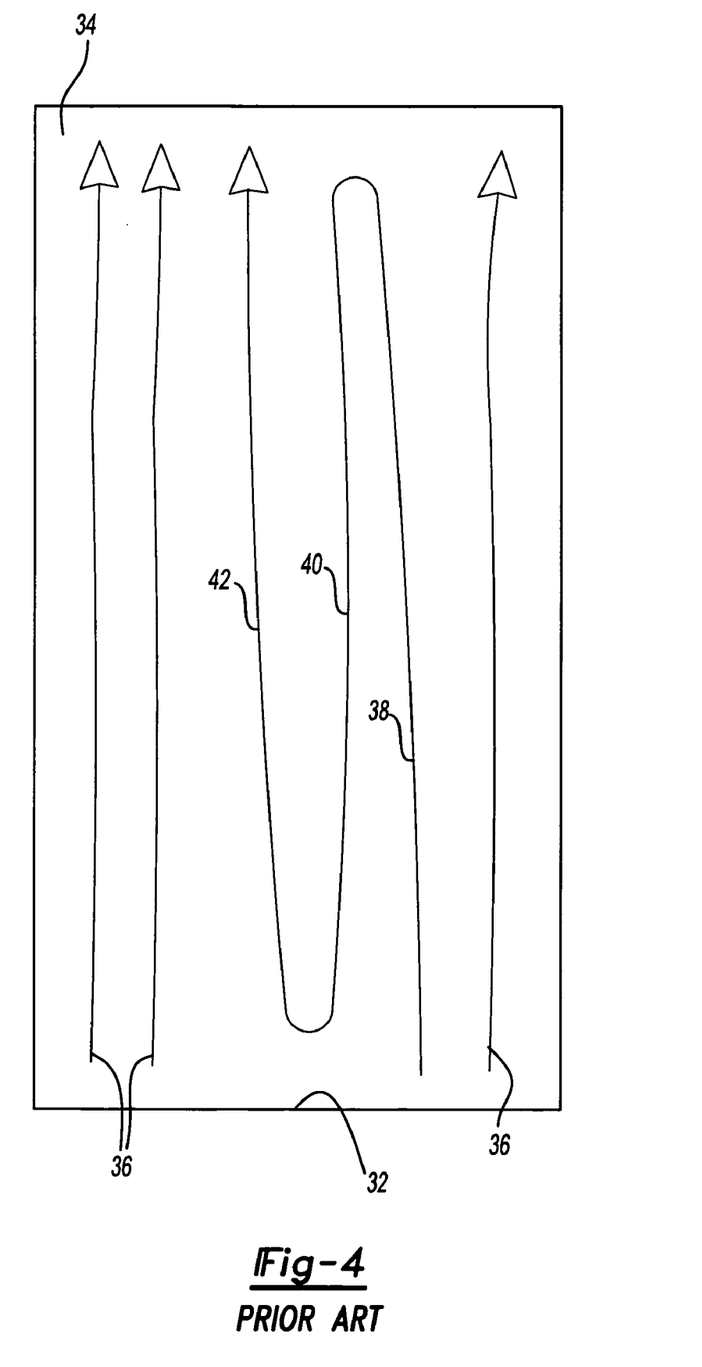
FIG. 4 schematically shows cooling airflow through the Prior Art turbine blade.

As shown schematically in FIG. 4, path 38 directs the air outwardly away from the platform 32 or "up," and then communicates the air to a "down" or inward path 40. Path 40 communicates to an outward flow path 42.

As shown in FIG. 3, the paths 38, 40 and 42 are trapezoidal in section. As mentioned above, the trapezoidal shape is selected to best take account for the Coriolis effect. Thus, path 38 has a larger side 37 and a smaller side 39, path 40 has a larger side 41 and a smaller side 43, and path 42 has a larger side 45 and a smaller side 47. As shown in FIG. 3, the primary direction of the flow in each of the paths 38, 40 and 42 is directed toward the largest sides 37, 41 and 45, respectively. As mentioned above, this takes advantage of the Coriolis effect, and results in increased heat transfer at the larger sides. However, this will also result in reduced heat transfer at the smaller sides. As shown, a suction wall 51 of the airfoil 34 is adjacent the larger side 41 of the path 40, and the smaller sides 39 and 47 of the paths 38 and 42, respectively. A pressure wall 46 of the airfoil is adjacent the larger sides 37 and 45 of the paths 38 and 42, respectively. Further, the smaller side 43 of the path 40 is positioned to be close to the pressure wall 46. As can be appreciated from FIG. 3, there is an area 100 between the smaller side 43 of the path 40 and the pressure wall 46 that is also an area of high curvature. Moreover, there is a good deal of distance between the smaller side 43 of the path 40 and the pressure wall 46 at area 100.

The area 101 is another area of similar challenge. Area 101 is spaced from the smaller side 39 of the path 38 and the suction wall 51. Area 101 is also an area of high curvature, and high thermal and mechanical stress, and has similar cooling concerns with regard to its spacing from the smaller side 39 of the path 38.

Areas 100 and 101 are subject to a good deal of stress for several reasons. First, the fact that they have high curvature and are adjacent the pressure or suction walls result in high thermal and mechanical stress. Moreover, since the path 40 is spaced relatively far away from the pressure wall 46, there is not as much cooling capacity at the area 100. A similar problem exists at area 101. Finally, the smaller side of the trapezoidal shape adjacent the areas has reduced surface area and cooling efficiency for cooling areas 100 and 101. For all of these reasons, the areas 100 and 101 are challenging areas to adequately cool.

Figures 5, 7:
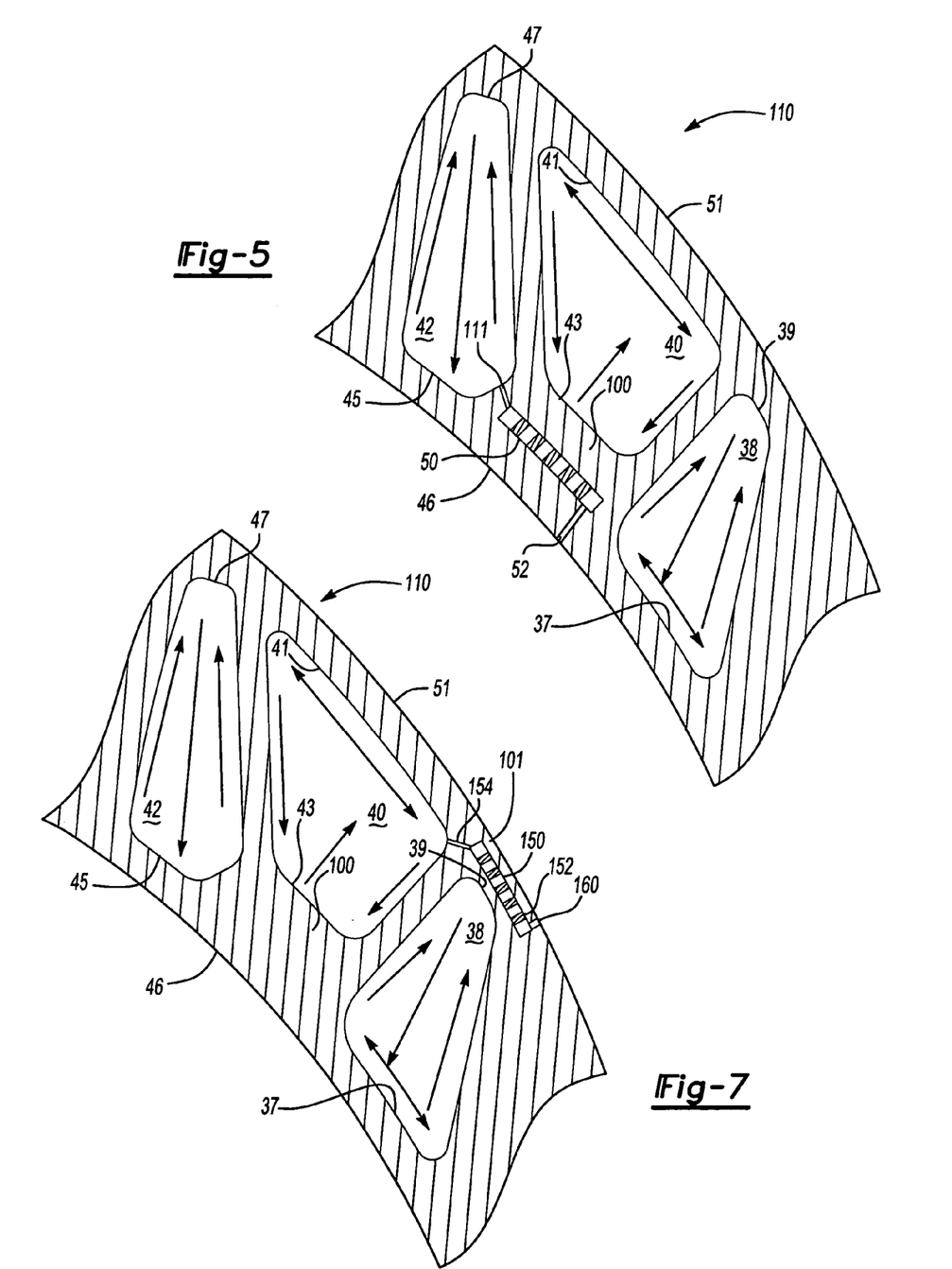
FIG. 5 shows an inventive portion of a first embodiment turbine blade.
FIG. 7 shows a second embodiment.

FIG. 5 shows a microcircuit 50 incorporated between the smaller side 43 of the second path 40 and the pressure wall 46 (i.e., in area 100). Notably, a plurality of pedestals 112 are disposed within the microcircuit 50 and extend between the sides of the microcircuit 50. The pedestals 112 assist in providing more efficient heat transfer by controlling the flow of the cooling air through the microcircuit. As shown, a passage 111 communicates air from the third path 42 to the microcircuit 50. Exhaust holes, slots, or ports 52 extend to the face of the pressure wall 46 to provide film cooling at the area 100.

The microcircuit is shown in exaggerated width to better illustrate its basic structure. The exact dimensional ranges, etc., are disclosed below.

Figure 6:
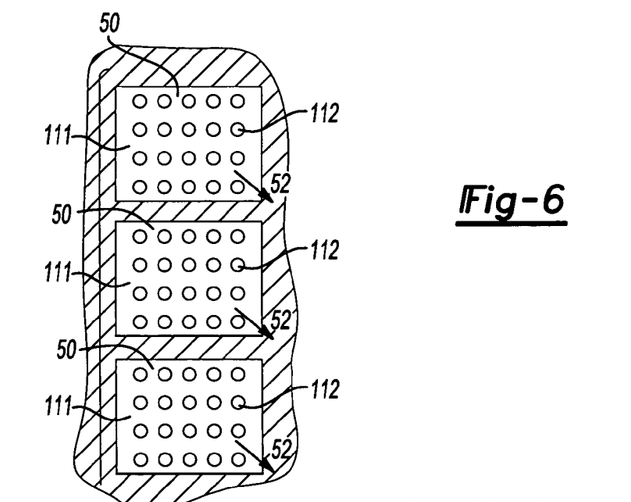
FIG. 6 schematically shows one feature of the FIG. 5 embodiment.

As can be appreciated from FIG. 6, there are preferably a plurality of such microcircuits spaced along the length of the airfoil, and into and out of the plane of FIG. 5. Cooling air is tapped from the path 42 through the openings 111 into a series of microcircuits 50 that are embedded into the airfoil 34. The air passes over the pedestals 112, and through the microcircuits 50 to the exhaust ports 52.

FIG. 7 shows another microcircuit embodiment 150 wherein the microcircuit is positioned in the area 101 between the smaller side 39 of the path 38 and the suction wall 51. Here again, an inlet passage 154 communicates cooling air from another of the serpentine channel paths 40. Pedestals 152 are placed within the microcircuit 150, and an exhaust port 160 communicates film cooling air to the suction wall 51. The embodiment of FIG. 7 would preferably include a plurality of spaced microcircuits 150 similar to that shown in FIG. 6.

The detail of the microcircuit can have many distinct shapes, positions, spacings, etc., and varying numbers of entry/exhaust passages per microcircuit, and relative shapes and sizes of the pedestals. Several available options are described below, however, these are merely exemplary. That is, the microcircuits 50 of FIG. 5 and the microcircuits 150 of FIG. 7 can have the configuration of FIG. 8 or 9, or some other configuration. For purposes of this application, the microcircuit is preferably simply a very thin circuit placed at an area where additional cooling is beneficial. The microcircuits that come within the scope of this invention can have varying combinations of pedestal shapes and sizes.

Figure 8:
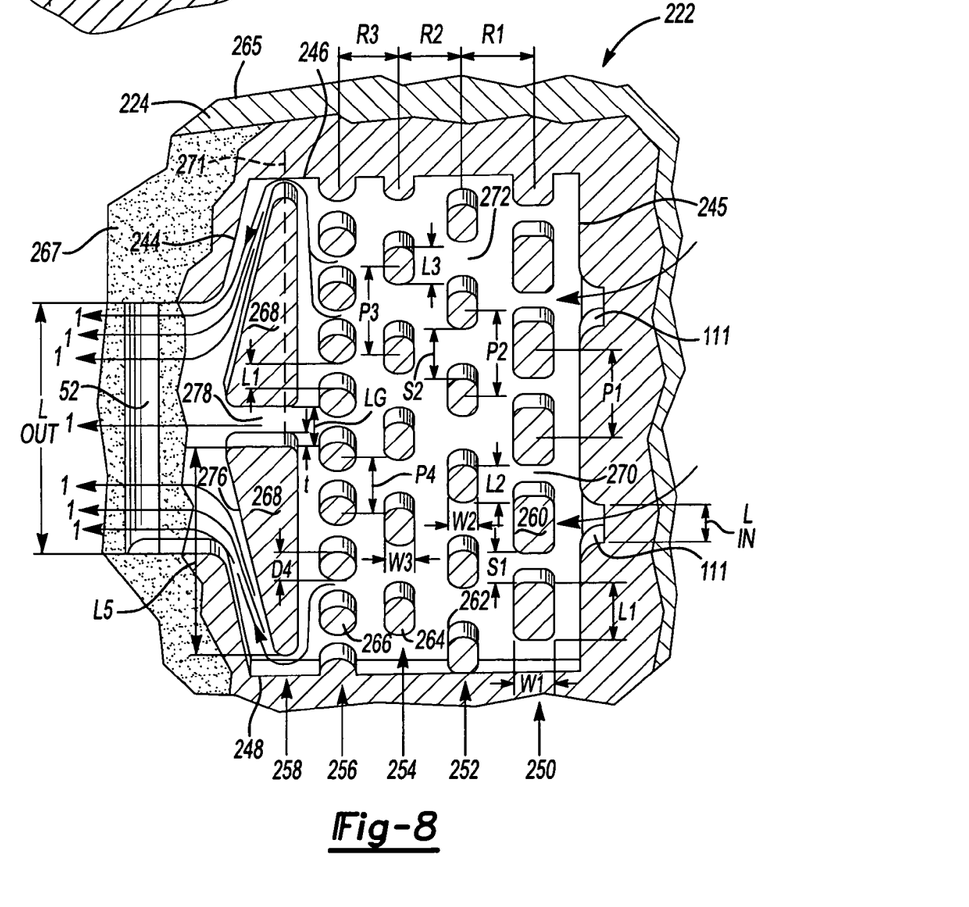
FIG. 8 is an enlarged diagrammatic view of one embodiment of a microcircuit cooling scheme that can be utilized with the present invention.

Referring now to FIG. 8, an exemplary microcircuit 222 will be further detailed. FIG. 8 is an enlarged view of a microcircuit cooling scheme that can be utilized at either the FIG. 5 or 7 locations. Microcircuits offer tailorable, high convective efficiency cooling. Along with high convective efficiency, high film effectiveness is required for an advanced cooling configuration. As mentioned, FIG. 6 illustrates the microcircuits 50 of the present invention that are embedded spaced along the pressure wall 46 of the airfoil 36. Microcircuits may be machined or otherwise molded within a part. In a preferred embodiment, the microcircuits are formed of refractory metals forms and encapsulated in the part mold prior to casting. Several refractory metals including molybdenum (MO) and Tungsten (W) have melting points that are in excess of typical casting temperatures of nickel based superalloys. These refractory metals can be produced in wrought thin sheet or forms in sizes necessary to make cooling channels characteristic of those found in turbine and combustor cooling designs. Preferably, parts incorporating this invention are formed in part or in whole of nickel based alloys or cobalt based alloys. Thin refractory metal sheets and foils possess enough ductility to allow bending and forming into complex shapes. The ductility yields a robust design capable of surviving a waxing/shelling cycle. After casting, the refractory metal can be removed, such as through chemical removal, thermal leeching, or oxidation methods, leaving behind a cavity forming the microcircuit 222. It is noted that microcircuits may also be manufactured using investment casting techniques with ceramic cores.

Each "square" of cooling microcircuit 222 embodiments can occupy a wall surface area as great as 0.1 square inches. It is more common, however, for a microcircuit 222 to occupy a wall surface area less than 0.06 square inches, and the wall surface of preferred embodiments typically occupy a wall surface area closer to 0.05 square inches. In the exemplary embodiment, the thickness, t, of the microcircuit 222, as measured into the wall, is preferably of approximately about 0.012 inch to approximately about 0.025 inch, and most preferably about less than 0.017 inch. These dimensions are for a turbine blade having a wall thickness of about 0.045–0.125 inch.

The microcircuit 222 includes a forward end 244, an aft end 245, a first side 246, a second side 248, and a number of rows 250, 252, 254, 256 of posts or pedestals 260, 262, 264, 266, 268, respectively, that extend between an outer wall (246, 265) of the path. The microcircuit 222 extends widthwise between its forward end 244 and aft end 245, and lengthwise, or in the radial direction, between its first side 246 and second side 248. An inlet aperture 111 (or 154, FIG. 7) extends through the first wall portion and is positioned proximate to the aft end 245 of the microcircuit 222 to provide a cooling airflow path from the path 42 (or 40) of the airfoil 34 into the microcircuit 222. An exit or exhaust aperture 52 (or 160) extends through the outer wall proximate to the forward end 244 providing a cooling airflow path from the microcircuit 222 into the core gas path, outside the wall. The microcircuit 222 is typically oriented forward to aft along streamlines of the core gas flow, G, although orientation may vary to suit the application at hand. In the exemplary embodiment, there are two race track shaped inlet apertures 111 that extend lengthwise in the radial direction. In the exemplary embodiment, the exit aperture 52 is a slot extending lengthwise in the radial direction. The exemplary length, Lin, of the inlet apertures 111 is about 0.025 inch while the length, Lout, of the exit apertures 52 is about 0.100 inch.

Some example microcircuits will be described to show the versatility of the microcircuit concept. As mentioned, these examples should not be taken as limiting the invention.

The row 250 has pedestals 260 formed substantially as elongated right rectangular cylinders. The pedestals 260 have a length L1 (measured parallel to the row) of about 0.040 inch, a width W1 (measured perpendicular to the row) of about 0.020 inch, a pitch, P1, of about 0.060 inch and a separation, S1, of about 0.020 inch. The pitch is defined as the on-center radial spacing between the respective pedestals within a row. The spacing is defined as the length of the pitch, P, minus the length of the diameter, D of the pedestal. The ratio of the pedestal dimension along the row, L, to the pitch, P, for the row defines a percentage of area along the particular row that is blocked by the pedestals, or referred to hereinafter as the restriction or blockage factor. For the identified dimensions above, the restriction or blockage factor is 67%.

The next row 252 has pedestals 262 also formed substantially as elongated right rectangular cylinders. The pedestals of this row have length, L2, of about 0.025 inch, a width W2 of about 0.015 inch, a pitch, P2, of about 0.0615 inch and separation, S2, of about 0.0365 inch. In the exemplary embodiment, L2, and W2 are both substantially smaller than L1 and W 1. The pitch P2, however, is substantially the same as P1 and the stagger also completely out of phase so that the pedestals 262 are generally behind associated gap 270. A row pitch, RI, of about 0.0375 inch is between rows 250, 252. For the identified dimensions above, the restriction or blockage factor is 42%.

The next row 254 has pedestals 264 also formed substantially as elongated right rectangular cylinders. The pedestals 264 have length, L3, of about 0.025 inch, a width, W3, of about 0.015 inch, a pitch, P3, of about 0.0615 inch, and a spacing, S3, of about 0.018 inch. In the exemplary embodiment, these are substantially the same as corresponding dimensions of the row 252 thereahead, but completely out of phase so that each pedestal 264 is immediately behind a gap 272. A row pitch, R2, of about 0.033 inch between the row 252 and the row 254 thereahead is like R1. For the identified dimensions above, the restriction or blockage factor is 42%.

The next row 256 has pedestals 266 formed substantially as right circular cylinders of diameter, D4 of about 0.0200 inch, pitch, P4, of about 0.038 inch and a spacing, S4, of about 0.018 inch. In the exemplary embodiment, D4 is smaller than the rectangular pedestal lengths. Additionally, the pitch P4 is smaller than pitches of the other rows and separation S4 is smaller than the separations of the rows other than the row 250. A row pitch, R3, of about 0.014 inch between the row 254 and the row 256 thereahead is, like R1 and R2. For the identified dimensions above, the restriction or blockage factor is 53%.

The next row 258 has two pedestals 268 each having a longitudinal axis 271 through the body of the pedestal such that the axis 271 extends in the radial direction. Thus, the pedestals 268 are elongated in shape in the radial direction and are aligned with the exit apertures 263 as shown in FIG. 8. The pedestals 268 are separated by a gap 278 that is centrally aligned with the exit aperture 52 in the forward end 244 of the microcircuit 222. The length, Lg, of the gap 278 in the radial direction is preferably no greater than about 0.015 inch. The pedestals 268 have generally a protrusion or apex 276 extending outward towards the exit aperture 52 to which it is aligned. In the exemplary embodiment, the length, L5, of the pedestals 268 along the radial direction is about 0.079 inch.

Thus, the rows 250, 252, 254, 256 and 258 have been described above and now the benefits achieved by the microcircuit 50 of FIG. 8 will now be described.

The first row 250 of pedestals 260 are spaced apart from one another in a pattern that controls local velocity and encourages lateral dispersion of cooling air flowing through the microcircuit 50. This dispersion results in the formation of wakes and increased heat pick up within the cooling circuit 222. The pedestals 260 are offset or staggered from the pedestals 262 of row 252. Likewise, the pedestals 264 of row 254 are offset from the pedestals 262 of row 252. The respective offsets are enough such that there is substantially no straight-line passage through the microcircuit 222. As the air passes through the pedestals 262 and 264, the wakes are reduced for a more uniform flow distribution. This result is achieved due to the relatively low restriction factor of the rows 252, 254 compared to the rows 250 and 256. Thus, the rows 252, 254 serve to minimize trailing wake turbulence and provide a progressive transition in wakes/turbulence within the cooling circuit 222. As the air passes through the next row 256, the air is metered thus increasing the velocity and, in turn, the heat transfer. It is noted that the row 250 has a greater restriction factor than the rows 252, 254, 256. Thus, air flow into the microcircuit 50 is distributed without excessive pressure drop and in a manner to maximize heat transfer.

The pedestals 28 minimize the wakes created by the turbulence of the air as it passes through the rows 250, 252, 254. Minimization of the wake turbulence avoids hot flow recirculation within the microcircuit 50 and facilitates heat pick-up. As the air flow is directed around the pedestals 268, it is uniformly distributed through the exit apertures 52. The use of slots for the exit apertures 52 is now appreciated. As the air exits the slots, a uniform film blanket of the pressure 46 or suction 51 sidewalls, respectively, is achieved. Thus, the pedestals 268 prevent flow streaking or discrete jets and through the exit aperture 52 (or 160). Streaking is not advantageous as the corresponding air jets upon exiting through the exit aperture 52 will not provide uniform coverage of the metal resulting in possible hot spots of the wall 46

Advantageously, the positioning of the pedestals 268, as described above, permits very good metering control of the air as it exits through the exit aperture 52 (or 160). More specifically, the cooling air flows through the gap 278 and around the pedestals 268 close to the first and second sides 246, 248. Thus, as the flow is metered through row 256, part of the flow will pass through the gap 278 while the remainder of the air will pass around the pedestals 268. Also, in this way and as shown by the streamlines 0, 1, 1', of FIG. 9, the air flow through the exit aperture 52 is uniformly distributed. The center streamline 0 operates so as to not permit the streamlines 1 from crossing over to interfere with the streamlines 1' and visa versa. Thus, the orientation of the pedestals 268 permit flow straightening while ensuring accurate metering control with the result being an improved film cooling and effectiveness.

Figure 9:
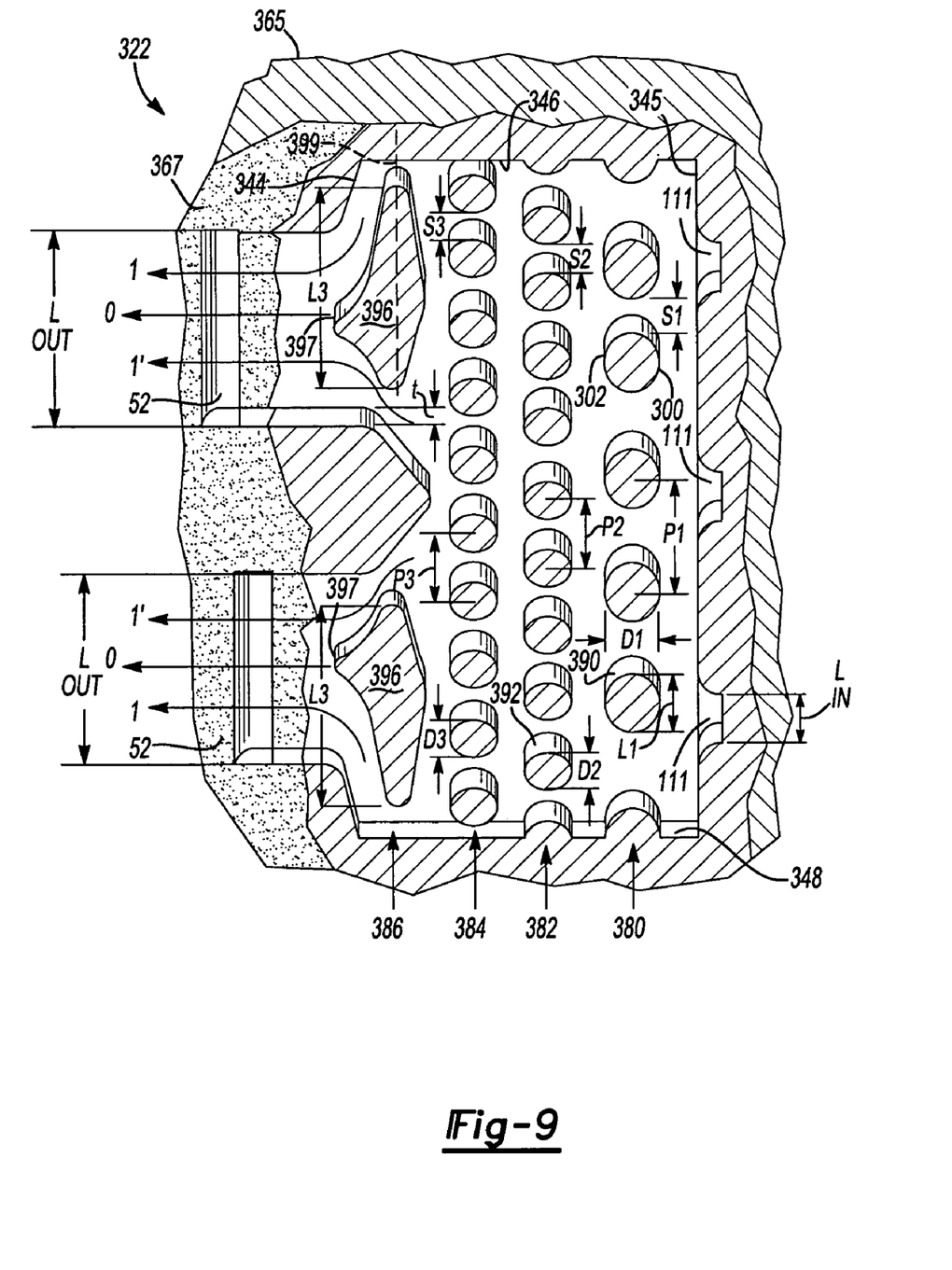
FIG. 9 is an enlarged diagrammatic view of an alternative embodiment microcircuit cooling scheme.

Referring now to FIG. 9, an alternate embodiment of the microcircuit 322 is shown. Like reference numbers and designations in the various drawings indicate like elements. The microcircuit 322 in this alternative embodiment has two exit apertures 52 and three inlet apertures 111. The exemplary embodiment microcircuit 322 will now be further described with respect to the cooling design and the benefits achieved. In the exemplary alternate embodiment, there are three race track shaped inlet apertures 111 that extend lengthwise in the radial direction and two exit apertures 52, preferably slots, also extending lengthwise in the radial direction. The exemplary length, Lin, of the inlet apertures 111 is about 0.025 inch while the length, Lout, of the exit apertures 52 is about 0.100 inch.

The microcircuit 322 has rows 380, 382, 384, 386 of pedestals or posts 390, 392, 394 and 396, respectively. Row 380 has pedestals 390 formed substantially as rounded triangular-like shaped cylinders in that there is a first side 300 that is flattened and generally perpendicular to the flow direction and then a generally rounded coverging side 302. The pedestals 390 have a major axis length, L1, of about 0.033 inch, a pitch, P1, of about 0.058 inch and a spacing, S1, of about 0.018 inch. The row 380 encourages lateral dispersion of the cooling air flowing into the microcircuit 322. For the identified dimensions above, the restriction or blockage factor is 52%.

The next two rows 382 and 384 have pedestals 392, 394, respectively, that are formed substantially as rounded right rectangular cylinders. Pedestals 392 have a diameter, D2, of about 0.020 inch, a spacing, S2, of about 0.0148 inch and a pitch, P2, of about 0.035 inch. For the identified dimensions above, the restriction or blockage factor is 57%. Pedestals 394 have a diameter, D3, of about 0.020 inch, a spacing, S3, of about 0.0148 inch, and a pitch P3, of about 0.035 inch. For the identified dimensions above, the restriction or blockage factor is 57%. Pedestals 392, 394 are generally offset or staggered relative to each other and serve to meter the air flow passing therebetween. The flow is metered by rows 382 and 384 to increase the flow velocity, local Reynolds Number and corresponding internal heat transfer coefficient. Thus, the concentration of pedestals 394 results in a higher restriction factor than the pedestals 390 in the row 380.

The last row 386 has two pedestals 396 where each pedestal 396 is aligned with one of the two respective exit apertures 52. The pedestals 396 have a longitudinal axis 399 that extends in the radial direction. Thus, the pedestals 396 are elongated in shape in the radial direction. Each pedestals 396 has generally a protrusion or apex 397 extending outward towards the respective exit aperture 52. Each of the pedestals 396 is generally centrally aligned with the respective exit aperture 52 (or 160). In the exemplary embodiment, the longitudinal length, L3, of the pedestals 394 is about 0.100 inch.

Thus, the rows 380, 382, 384 and 386 have been described above and now the benefits achieved by the microcircuit 322 of FIG. 9 will now be described.

The first row 380 of pedestals 390 are spaced apart from another and have a shape as described hereinabove that controls local velocity and encourages lateral dispersion of cooling air flowing through the microcircuit 322. Also, the pedestals 390 minimize wake turbulence. The cooling air flow impinges onto the side 300 and is forced around the pedestals 390 by the side 302 thereby reducing the wake formed and avoiding hot spots behind the pedestals 390.

The pedestals 392, 394 of the next two rows 382, 384 are staggered with relation to each other and with respect to the pedestals 390 of the first row 380. Thus, there is substantially no straight line passage through the microcircuit 322. As the cooling air passes through their rows, the wakes are reduced for a more uniform flow distribution.

Advantageously, the positioning of the pedestals 396, as described above, permits very good metering control of the cooling air as it exits through the respective exit aperture 52. More specifically, as the cooling air passes through rows 382 and 384, the air impinges onto the pedestals 396 and is directed around the pedestals to exit through the corresponding exit aperture 52. Also, in this way and as shown by the streamlines, 0, 1, 1', the main streamline 0 provides for uniform flow distribution out through the exit aperture 52. That is to say, the streamlines 1 do not cross with the streamlines 1' and visa versa. The main streamline, 0, like that of the first embodiment shown in FIG. 8, is generally aligned with the center of the corresponding exit aperture 52. However, in the alternative embodiment, the pedestals 396 are aligned with the exit aperture 52 such that the majority of the length, L3, of the pedestals 396 are exposed to the exit aperture 52. As such, the streamlines, as they circumvent the pedestals, are free to exit through the exit aperture 52. Thus, the orientation of the pedestals 396 permit flow straightening while ensuring accurate metering control with the result being an improved film cooling and effectiveness.

Thus, the air flow is directed around the pedestals 396, and is uniformly distributed through the exit apertures 52. The use of slots for the exit apertures 52 is now appreciated. As the air exits the slots, a uniform film blanket of the outer, and more specifically the pressure and/or suction sidewalls 46, 51, respectively, is achieved. Thus, the pedestals 396 prevent flow streaking or discrete jets and through the exit apertures 52 (or 160). Streaking is not advantageous as the corresponding air jets upon exiting through the exit aperture 52 (or 160) will not provide uniform coverage of the metal resulting in possible hot spots of the wall 24. The pedestals 396 also serve to minimize the wakes created by the turbulence of the air as it passes through the rows 380, 382, 384. Minimization of the wakes avoids flow recirculation within the microcircuit 322 and facilitates heat pick-up.

Notably, for enhanced structural integrity of the airfoil, the microcircuits may be disposed within the wall such that the exit apertures, or slots, are not collinear.

In the exemplary embodiment, there will be a plurality of microcircuits disposed within the pressure and/or suction sidewalls, 46, 51, respectively. Further, the inlet apertures 111 (154) of each of the respective microcircuits should be positioned codirectionally with respect to the counter-rotating circulations caused by the Coriolis forces on the cooling air flowing through the respective passages 42, 40. In this way, the counter-rotating circulations will be employed to assist in the ingestion of the cooling air into the inlet apertures 111, 154 and into the microcircuit 222, 322.

The present invention thus provides additional cooling at areas that have high thermal and mechanical stress, and have been provided with less cooling capacity than would be desirable.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An airfoil comprising:
   an airfoil being curved with a pressure wall and a suction wall spaced from each other, said airfoil extending from a base to a tip;
   cooling channels formed between said suction and pressure walls and within said airfoil, said cooling channels including a serpentine channel, said serpentine channel having a first path extending from said base outwardly and through said airfoil towards said tip, a second path communicating with said first path and returning cooling fluid back toward said base, and a third path communicating with said second path and returning cooling fluid back outwardly away from said base, said first, second and third paths each having a generally trapezoidal shape in cross-section, with each of said trapezoidal shapes having a larger side and a smaller side, said larger sides of said first and third paths being positioned facing one of said pressure and suction walls and said smaller sides of said first and third paths being positioned facing the other of said pressure and suction walls, and said larger side of said second path being positioned facing said other of said pressure and suction walls, with said smaller side of said second path being positioned facing said one of said pressure and suction walls;
   a microcircuit cooling circuit embedded within said airfoil adjacent said smaller side of one of said first, second, and third paths and between said smaller side of said one of said first, second, and third paths and a facing one of said pressure and suction walls, said microcircuit cooling circuit receiving cooling fluid to provide additional cooling in an area between said smaller side of said one of said first, second, and third paths and said facing one of said pressure walls; and
   said microcircuit cooling circuit being smaller in cross-section than said first, second and third paths, and a plurality of pedestals extending across said microcircuit cooling circuit.

2. The airfoil as set forth in claim 1, wherein said microcircuit cooling circuit receives said cooling fluid from a source selected from said first, second, and third paths, and other than said one of said first, second and third paths.

3. The airfoil as set forth in claim 2, wherein said microcircuit cooling circuit is positioned between said smaller side of said second path and said pressure wall.

4. The airfoil as set forth in claim 3, wherein said microcircuit cooling circuit receives said cooling fluid from said third path.

5. The airfoil as set forth in claim 2, wherein said microcircuit is positioned between said smaller side of said first path and said suction wall.

6. The airfoil as set forth in claim 5, wherein said microcircuit cooling circuit receives said cooling fluid from said second path.

7. The airfoil as set forth in claim 1, wherein cooling fluid leaves said microcircuit cooling circuit through a plurality of openings in said facing one of said suction and pressure walls to provide film cooling.

8. The airfoil as set forth in claim 1, wherein said airfoil is a turbine blade and said base is a platform.

9. The airfoil as set forth in claim 1, wherein said cooling fluid is air.

10. The airfoil as set forth in claim 1, wherein a thickness of said microcircuit cooling circuit measured in a dimension between said smaller side of said one of said first, second and third paths, and said one of said pressure and suction walls is between approximately 0.012 and 0.025 inch.

11. The airfoil as set forth in claim 1, wherein said microcircuit cooling circuits include a plurality of discrete microcircuits spaced along a direction extending from said base toward said tip of said airfoil.

12. The airfoil as set forth in claim 1, wherein said pedestals include a plurality of distinct shapes.

13. The airfoil as set forth in claim 12, wherein said microcircuit cooling circuit includes a plurality of microcircuit cooling circuits spaced along a direction extending from said base and toward said tip.

14. The airfoil as set forth in claim 13, wherein there are a plurality of said inlets into said microcircuit cooling circuits.

15. The airfoil as set forth in claim 13, wherein there are a plurality of said outlets from said microcircuit cooling circuits.

16. The airfoil as set forth in claim 1, wherein a Coriolis effect on said first and third paths is distinct from a Coriolis effect on said second path, with a primary flow direction due to the Coriolis effect being directed against said larger sides of each of said first, second and third paths.

17. A turbine blade comprising:
   an airfoil extending outwardly of a platform, said airfoil being curved with a pressure wall and a suction wall spaced from each other;

cooling channels formed between said suction and pressure walls and within said airfoil, said cooling channels including a serpentine channel, said serpentine channel having a first path extending from said platform outwardly of said platform and through said airfoil, a second path communicating with said first path and returning cooling fluid back toward said platform, and a third path communicating with said second path and returning cooling fluid back outwardly away from said platform, said first, second and third paths having a generally trapezoidal shape in cross-section, with each of said trapezoidal shapes defining a larger side and a smaller side, said larger sides of said first and third paths being positioned facing said pressure wall and said smaller sides of said first and third paths being positioned facing said suction wall, and said larger side of said second path being positioned facing said suction wall, with said smaller side of said second path being positioned facing said pressure wall; and a microcircuit cooling circuit positioned between said pressure wall and said smaller side of said second path, said microcircuit cooling circuit receiving cooling fluid to provide additional cooling in an area between said smaller side of said second path and said pressure wall, said microcircuit cooling circuit receiving said cooling fluid from one of said first and third paths, and said microcircuit cooling circuit communicating with a plurality of openings in said pressure wall to pass said cooling fluid onto said pressure wall to provide film cooling, said microcircuit cooling circuit being smaller in cross-section than said first, second and third paths.

18. The turbine blade as recited in claim 17, wherein said microcircuit cooling circuit receives cooling fluid from said third path.

19. A gas turbine engine comprising:
a fan;
a compressor;
a combustion section; and
a turbine having rotor blades, and vanes, at least one of said rotor blades and said vanes having an airfoil with a base and a tip, and said airfoil extending between a suction wall and a pressure wall, and cooling channels formed between said suction and pressure walls and within said airfoil, said cooling channels including a serpentine channel, said serpentine channel having a first path extending outwardly away from said base and through said airfoil towards said tip, a second path communicating with said first path and returning cooling fluid back toward said base, and a third path communicating with said second path and returning cooling fluid back outwardly away from said base, said first, second and third paths each having a generally trapezoidal shape in section, with each said trapezoidal shape defining a larger side and a smaller side, said larger sides of said first and third paths being positioned facing one of said pressure and suction walls and said smaller sides of said first and third paths being positioned facing the other of said pressure and suction walls, and said larger side of said second path being positioned facing said other of said pressure and suction walls, with said smaller side of said second path being positioned facing said one of said pressure and suction walls, a microcircuit embedded within said airfoil adjacent said smaller side of one of said first, second, and third paths and between said smaller side of said one of said first, second, and third paths and a facing one of said pressure and suction walls, said microcircuit cooling circuit receiving cooling fluid to provide additional cooling in an area between said smaller side of said one of said first, second, and third paths and said pressure wall.

20. The gas turbine engine as set forth in claim 19, wherein said microcircuit cooling circuit receives said cooling fluid from a source selected from said first, second, and third paths, and other than said one of said first, second and third paths.

21. The gas turbine engine as set forth in claim 19, wherein said microcircuit cooling circuit is positioned between said smaller side of said second path and said suction wall.

22. The gas turbine engine as set forth in claim 21, wherein said microcircuit cooling circuit receives said cooling fluid from said third path.

23. The gas turbine engine as set forth in claim 19, wherein said microcircuit is positioned between said smaller side of said first path and said suction wall.

24. The gas turbine engine as set forth in claim 23, wherein said microcircuit cooling circuit receives said cooling fluid from said second path.

25. The gas turbine engine as set forth in claim 19, wherein said one of said rotor blades and said vanes is a rotor blade and said base is a platform.

26. The gas turbine engine as set forth in claim 19, wherein a thickness of said microcircuit cooling circuit measured in a dimension between said smaller side of said one of said first, second and third paths, and said one of said pressure and suction walls is between approximately 0.012 and 0.025 inch.

27. The gas turbine engine as set forth in claim 19, wherein said microcircuit cooling circuits include a plurality of discrete microcircuits spaced along a direction extending from said platform toward said tip of said airfoil.

28. The gas turbine engine as set forth in claim 19, wherein said pedestals include a plurality of distinct shapes.

29. The gas turbine engine as set forth in claim 28, wherein said microcircuit cooling circuit includes a plurality of microcircuit cooling circuits spaced along a direction extending from said base and toward said tip.

30. The gas turbine engine as set forth in claim 29, wherein there are a plurality of said inlets into said microcircuit cooling circuits.

31. The gas turbine engine as set forth in claim 29, wherein there are a plurality of said outlets from said microcircuit cooling circuits.

32. The gas turbine engine as set forth in claim 19, wherein a Coriolis effect on said first and third paths is distinct from a Coriolis effect on said second path, with a primary flow direction due to the Coriolis effect being directed against said larger sides of each of said first, second and third paths.

* * * * *